United States Patent
Herolzer

[15] 3,702,599
[45] Nov. 14, 1972

[54] SHELLFISH GROWOUT TRAY

[72] Inventor: Ralph H. Herolzer, Cincinnati, Ohio

[73] Assignee: Vanguard Industries Inc., Cincinnati, Ohio

[22] Filed: May 27, 1971

[21] Appl. No.: 147,583

[52] U.S. Cl. ................................................. 119/4
[51] Int. Cl. ........................................... A01k 61/00
[58] Field of Search ............................. 119/4, 2, 3

[56] References Cited

UNITED STATES PATENTS

| | | | |
|---|---|---|---|
| 3,192,899 | 7/1965 | Lucey et al. ................. 119/4 |
| 3,499,421 | 3/1970 | MacDonald et al. ......... 119/2 |
| 3,650,244 | 3/1972 | Fordham ....................... 119/4 |

*Primary Examiner*—Hugh R. Chamblee
*Attorney*—Cushman, Darby & Cushman

[57] ABSTRACT

A device for sustaining the growth of shellfish, such as oysters and the like, comprising a one-piece, molded plastic tray consisting of a bottom wall and four side walls providing an open top for the efficient loading of immature shellfish into the tray, the tray having stacking rails and tray supporting surfaces enabling the loaded tray to be guidingly moved into a stable operative stacked relation with a plurality of like loaded trays wherein adjacent trays define an operative growth space therebetween, the bottom wall being operative to support immature shellfish and provide with perforations permitting efficient unitary movement of the operatively stacked trays into and out of an operative position within the water environment of growth, the side walls being perforated so that when the tray is in such operative position sufficient water flow through the operative space is provided to nourish the growing shellfish while predatory water life is excluded therefrom, the height of the side walls being such that the operative space is sufficient to permit growth of the shellfish to maturity while insuring an efficient number of operative spaces within a given stack height.

12 Claims, 4 Drawing Figures

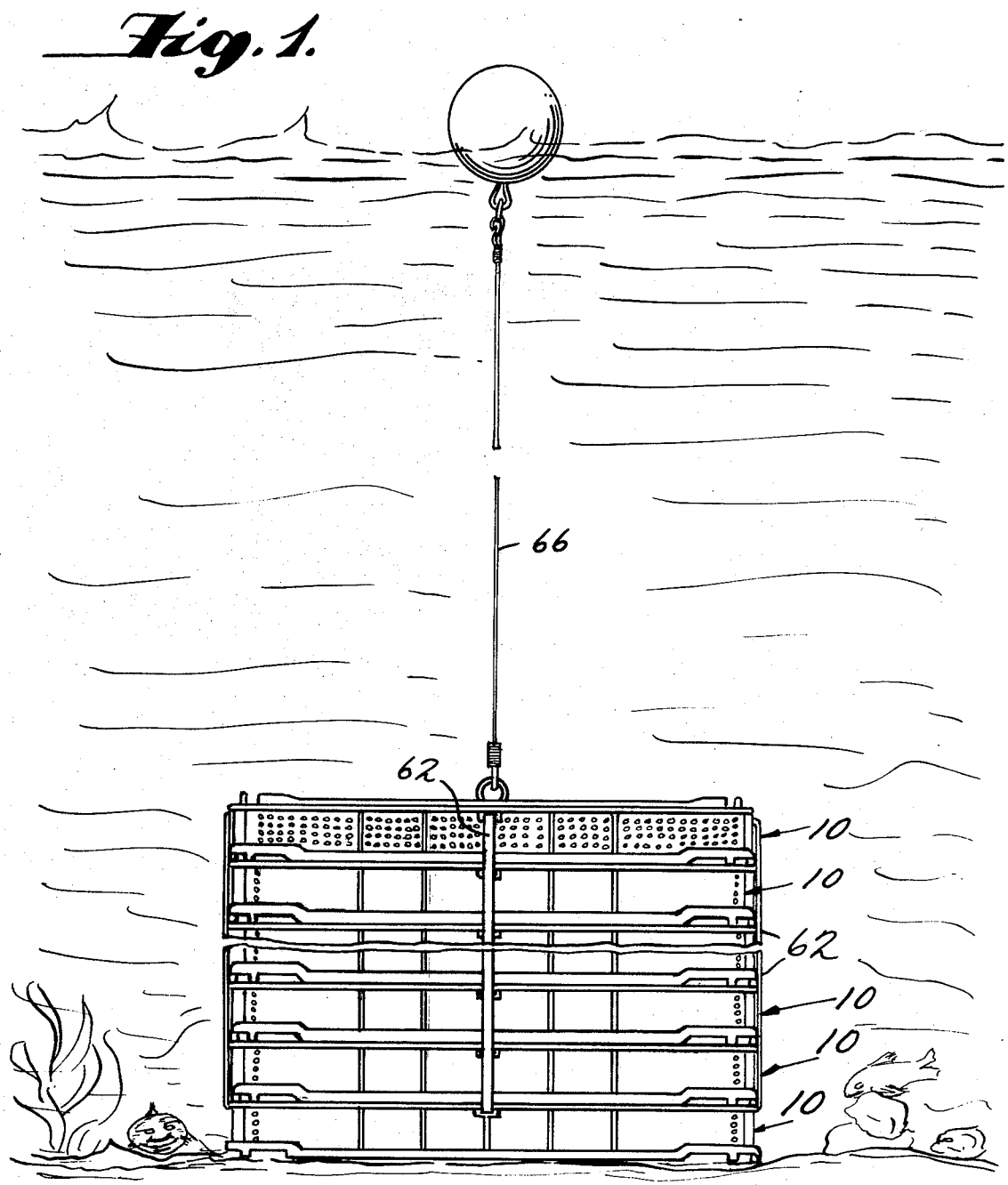

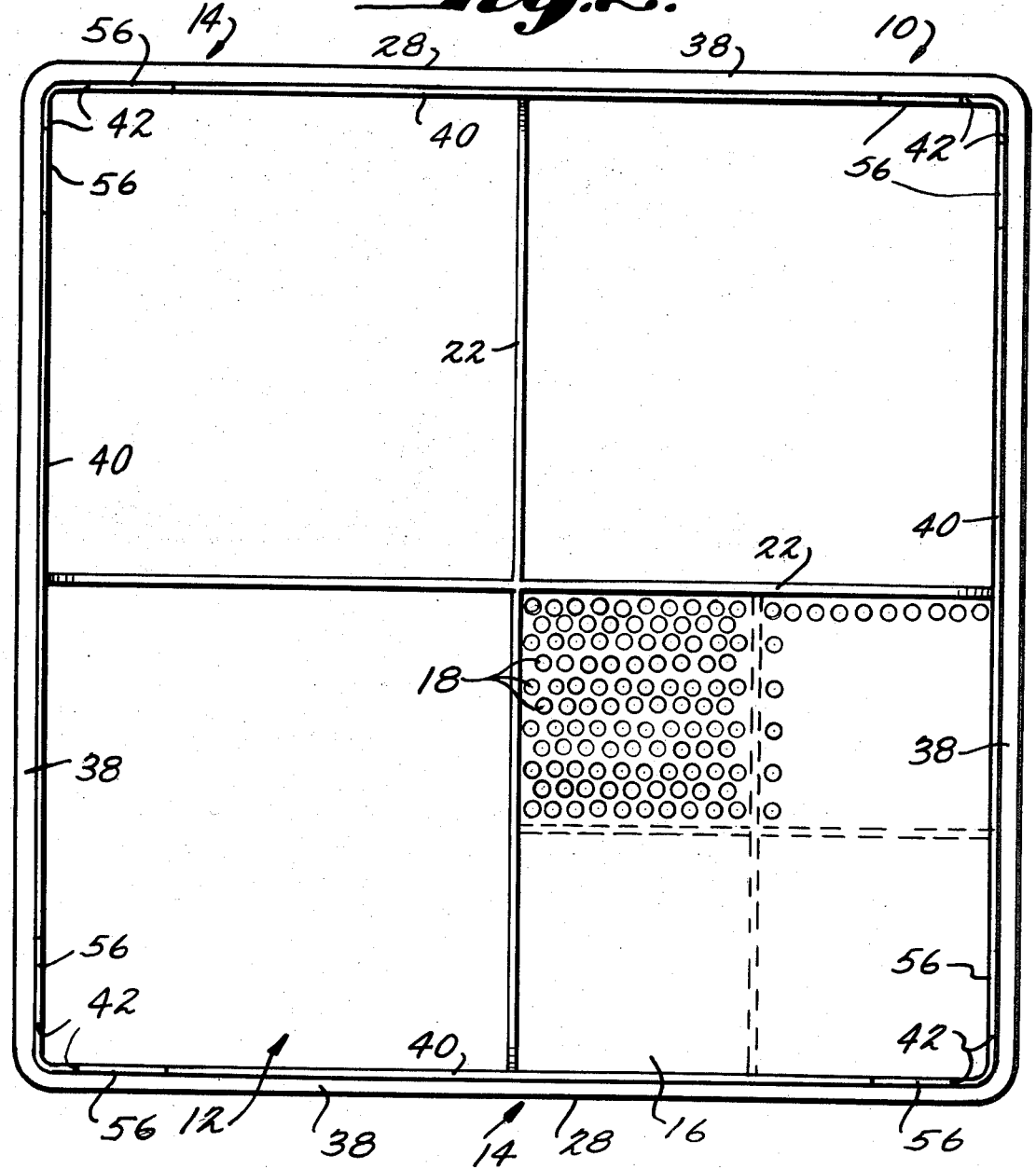

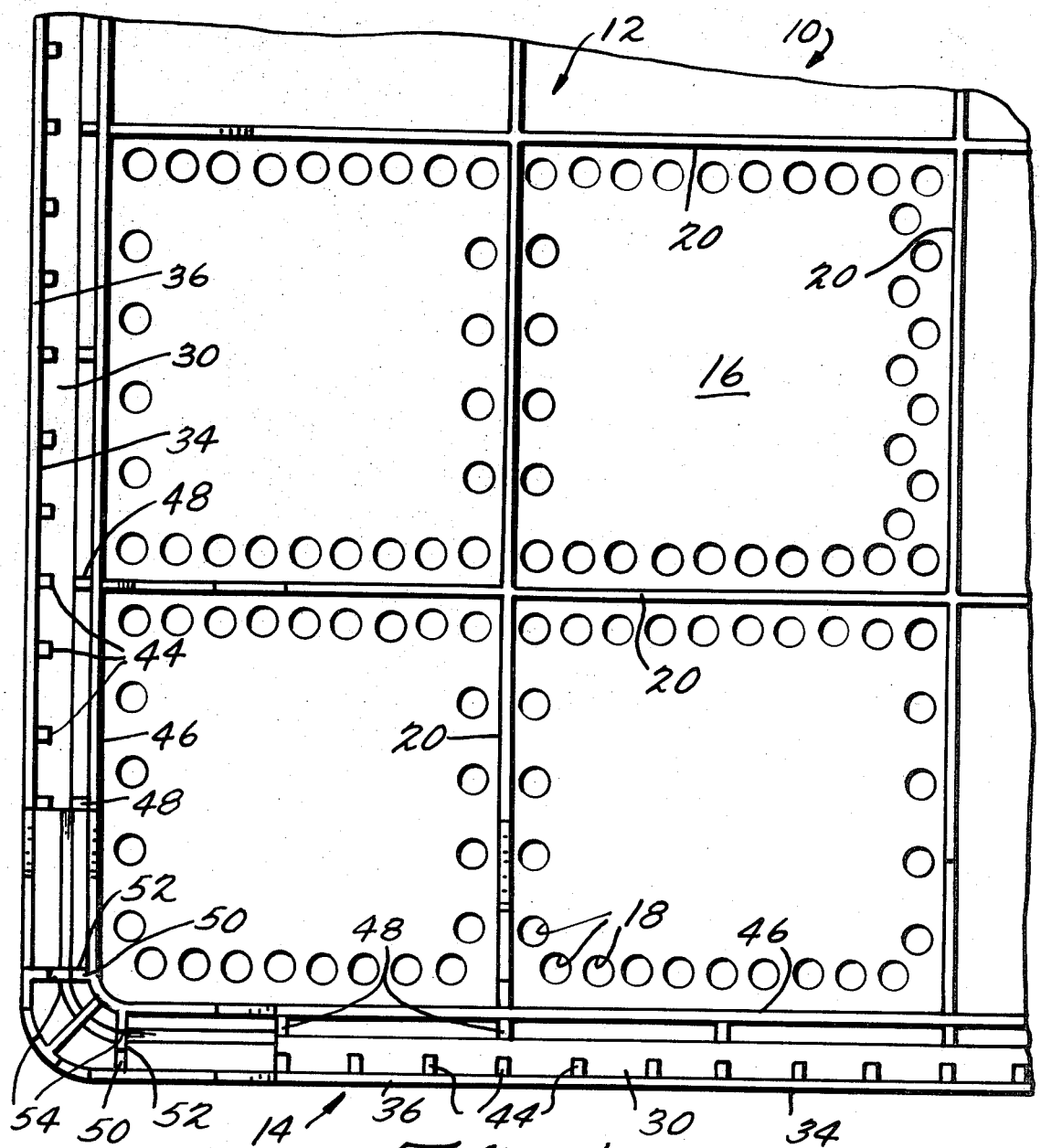

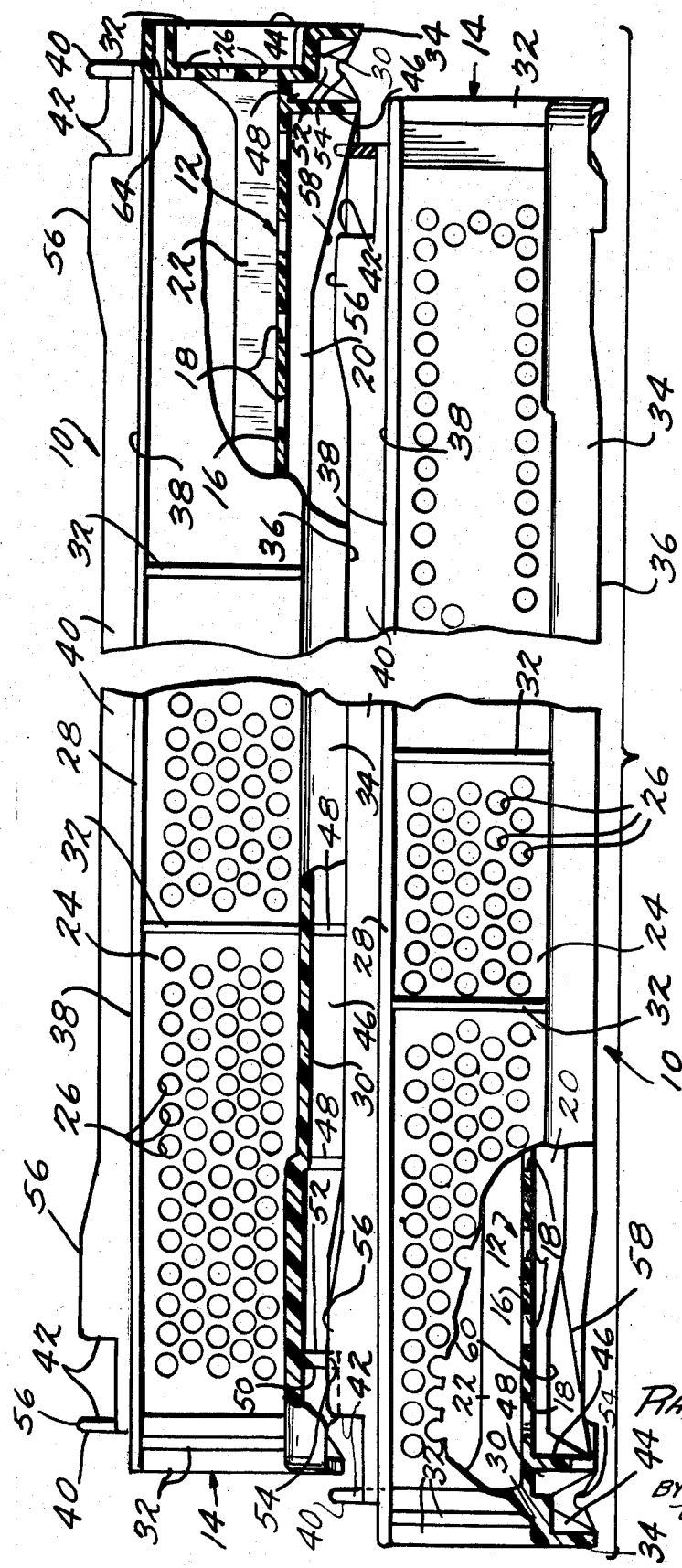

SHELLFISH GROWOUT TRAY

This invention relates to the art of shellfish raising and more particularly to an improved device for sustaining the growth of shellfish, such as oysters and the like.

It has long been the practice in the art of growing shellfish, such as oysters and the like, to utilize dredging techniques to enhance their natural growth. While these techniques insure a source of mature oysters beyond that provided by natural growth, the percentage recovery obtained by such techniques in relation to the number of seeded oysters is extremely low.

In recent years it has been found that the yields can be substantially improved by containing the seeded immature oysters throughout the growth period within receptacles capable of being moved into and out of operative position within the body of water where growth is to occur. Heretofore, this system has been practiced with the use of bread trays of the type disclosed in commonly-assigned U.S. Design Pat. No. Des. 197,672, the construction of the trays being supplemented with screening and blocks. While the use of the prior art bread trays and supplemental screening and blocks demonstrated the operability of the concept of the system, the makeshift arrangement did not afford all of the functional advantages desired in a device for sustaining the growth of oysters by this system.

An object of the present invention is to provide a device for sustaining the growth of shellfish, such as oysters and the like, embodying an improved tray having a perforated bottom wall and perforated side walls constructed so as to provide for the efficient loading of the tray, efficient handling of each tray into a stable operative stacked relation, efficient movement of the operatively stacked trays into and out of an operative position within the water environment of growth and an efficient flow of water through the operative space of confinement sufficient to nourish the shellfish to mature size while at the same time insuring an efficient number of trays within a given stack height.

Another object of the present invention is the provision of a device of the type described embodying a perforated wall construction for obtaining the aforementioned functional advantages with optimum efficiency.

Still another object of the present invention is the provision of a device of the type described having upper and lower tray supporting surface means and stacking means operable to facilitate movement of a tray into stacked relation by a guided sliding action without regard to end-to-end orientation of side-to-side orientation of the tray.

Still another object of the present invention is the provision of a tray device having tray supporting surface means and stacking means of the type described which provide a high degree of strength to a plurality of trays secured in operative stacked relation.

These and other objects of the present invention will become more apparent during the course of the following detailed description and appended claims.

The invention may best be understood with reference to the accompanying drawings wherein an illustrative embodiment is shown.

In the drawings:

FIG. 1 is a front elevational view of a device for sustaining the growth of shellfish, such as oysters and the like, embodying the principles of the present invention, the device being illustrated in operative stacked relation with a plurality of similar devices within its operative position in a water environment of growth;

FIG. 2 is a top plan view of the device;

FIG. 3 is a fragmentary bottom view of the device; and

FIG. 4 is a fragmentary sectional view illustrating the manner in which the device is moved into stacked relation to a similar device by a guided sliding action.

Referring now more particularly to the drawings, there is shown in FIGS. 2 and 3 thereof a device, generally indicated at 10, which embodies the principles of the present invention. The device 10 is molded as an integral unit of a plastic material capable of withstanding the deleterious effects of a prolonged water environment. While any of the well-known plastic materials having such capabilities may be utilized, a preferred material is polypropylene. The device 10 is generally in the form of a tray including a bottom wall 12 of rectangular configuration in plan, preferably square, and four integrally interconnected side walls 14 integrally connected with the periphery of the bottom wall 12 and extending vertically upwardly therefrom.

As best shown in FIGS. 2 and 3, the bottom wall 12 is preferably constructed of a main horizontally extending panel 16, having a plurality of perforations 18 provided therein. Preferably, the lower surface of the bottom panel 16 has a plurality of strengthening ribs 20 extending downwardly therefrom. As best shown in FIG. 3, the strengthening ribs 20 are of elongated straight configuration disposed in parallel relation to each pair of parallel side walls 14, thus forming a criss-cross pattern consisting of 16 squares. As best shown in FIG. 2, the upper surface of the bottom panel 16 preferably has a pair of intersecting perpendicularly related elongated ribs 22 which serve not only to strengthen the bottom wall, but to provide partitions therein dividing the bottom wall into quadrants. As best shown in FIG. 4, the height of the ribs 22 is substantially less than the height of the side walls 14.

Each side wall 14 is preferably constructed of a main vertically extending panel 24 having a plurality of perforations 26 provided therein. In order to strengthen the perforated side panels 24, each side panel is formed with a strengthening flange 28 extending horizontally outwardly from the upper edge thereof. Extending horizontally outwardly from the bottom edge of each side panel 24 is a lower flange 30 and a plurality of horizontally coextensive strengthening ribs 32 are formed vertically between the upper and lower flanges 28 and 30 in spaced relation therealong.

Extending downwardly from the outer edge of each lower flange 30 is a vertically extending flange 34. Each vertical flange 34 has a lower downwardly facing tray supporting surface 36 which is complementary to and compatible with an upwardly facing tray supporting surface 38 provided by the corresponding upper flange 28.

Extending upwardly from the inner edge portion of each upper flange 28, in alignment with the associated side panel 24, is an elongated stacking rail 40, the ends of which are formed by vertically extending stacking surfaces 42 disposed in closely spaced relation to the adjacent side wall. Each stacking rail 40 is disposed in a vertical plane spaced inwardly of the associated vertical flange 34 so that when the tray device 10 is disposed in vertically stacked relation upon a like device with the lower tray supporting surfaces 36 thereof in registered engagement with the upper tray supporting surfaces 38 of the like tray device, each stacking rail 40 of the like device will be disposed in inwardly spaced parallel coextensive relation with the associated vertical flange 34 of the tray device 10. In order to guide the two trays into such relationship, there is provided a plurality of horizontally spaced triangular shaped ribs 44 disposed in the intersection between each vertical flange 34 and the associated horizontal flange 30.

In order to positively prevent each stacking rail 40 from being deformed inwardly when the tray device is disposed in stacked relation to a plurality of like tray devices, a second or inner vertically extending flange 46 is formed in inwardly spaced relation to each outer vertical flange 34. As shown, each inner vertical flange 46 extends downwardly from the bottom panel adjacent its juncture to the associated side wall 14. Each inner vertical flange is strengthened by a plurality of horizontally spaced ribs 48, the lower surfaces of which extend upwardly and outwardly from the lower edge of the flange to the inner edge of the associated lower horizontal flange 30.

Extending between each pair of outer and inner vertical flanges adjacent each end thereof is an end wall 50 providing an inwardly facing stacking surface 52 adapted to cooperatively interengage a corresponding stacking surface 42 so as to positively prevent relative horizontal movement between two adjacent trays disposed in the aforesaid vertically stacked relation.

It can thus be seen that when the tray device 10 is disposed in the aforesaid vertically stacked relation with respect to a like device, each stacking rail 40 of the like device will engage between the associated inner and outer vertical flanges 34 and 46 of the device 10, the stacking surfaces 42 and 52 serving to positively prevent relative horizontal movement between the two devices. With this construction, the flanges serve to prevent both inward and outward deflection of the stacking elements and side walls of the like device disposed therebelow, thus providing an optimum vertical strength to the stack. While it is within the contemplation of the present invention to provide a stacking arrangement comprised of upper stacking rails formed in a continuous band to cooperate with either an outer flange without an inner flange or an inner flange without an outer flange, the arrangement described is preferred because of the optimum strength characteristics.

The preferred dual flange arrangement is provided with means for enabling the device 10 to be moved with a guided sliding action into stacked relation. To this end, each end wall 50 has a centering groove 54 formed in the lower surface thereof adapted to receive the upper edge surface of a rail 40 of a like device therebelow. In order to insure that the leading outer flange 34 will clear the associated leading stacking rail 40 as two trays are moved into stacking relation, each stacking rail 40 is formed with a ramp 56 adjacent each end thereof. It will be understood that the adjacent corresponding end portions of the horizontal flanges 30 are offset upwardly to accommodate the ramps 56.

In order to insure that each trailing inner flange 46 will clear the associated trailing stacking rail 40, a ramp 58 is formed on the central strengthening rib 20 adjacent each inner flange 46. The end portions of the remaining strengthening ribs 20 are relieved, as indicated at 60 (FIG. 4), to provide clearance for the ramps 56. Similar relief is provided adjacent the ends of the flanges 34 and 46 as well as the corners of the outer flanges 34.

With the particular arrangement shown it will be understood that the device 10 can be moved into vertically stacked relation on a similar device 10 by the operator gripping the device adjacent two trailing corners thereof. The leading corners are then placed on the central portion of the stacking rails 40 of the like device therebelow, the lower surfaces and centering groove 54 of the end walls 50 serving to provide a lateral centering action. The operator then moves the tray forwardly, supporting same at its lower corners until the leading half of the device is disposed over the trailing half of the like device therebelow.

As soon as the device 10 has reached this position, the operator can release the support of the trailing corners of the tray. The trailing ramps 56 of the stacking rails 40 of the lower device engage the lower surface of the horizontal flanges 30 to support the device 10 solely on the like device therebelow. The operator then simply pushes the device 10 forwardly without providing any vertical support and the device is guided with a sliding action along the stacking rails of the like device therebelow. FIG. 4 illustrates the position of two such devices just prior to the movement of the device 10 into stacked relation with a like device therebelow. It will be noted that as the leading ramps 56 are engaged, the leading portion of the device 10 is moved upwardly a distance sufficient to provide for clearance of the leading outer flange 34 past the leading stacking rail 40 of the like device therebelow. Simultaneously, the trailing ramp 58 engages the central portion of the trailing stacking rail 40 to move the trailing end of the device 10 upwardly to provide clearance for the trailing inner flange 46 past the trailing stacking rail 40 of the like device therebelow.

Thus, as the device 10 moves into a position of vertical alignment with the like device disposed therebelow, the device 10 will fall downwardly into a proper vertically stacked relation, as indicated above, wherein the surfaces 34 engage the surfaces 38 and the stacking rails 40 are disposed between the associated inner and outer flanges with the stacking surfaces 42 and 52 preventing relative horizontal movement.

OPERATION

The device 10 of the present invention is used in conjunction with a plurality of similar devices in a system of sustaining the growth of shellfish, such as oysters and the like. In general, the system contemplates the procedure of loading seed oysters within a device 10, arranging a plurality of loaded devices in an operative vertically stacked relation, securing the plurality of loaded devices is such stacked relation and lowering the secured stack into an operative position within a water environment where the immature oysters can grow due to the nourishment provided by the water environment.

The system further contemplates oyster growth in such operative position over a total period of two growth seasons, during which period it is necessary from time to time to raise the secured-together stack of devices from its operative position out of the water environment and to perform cleaning and redistribution operations with respect to each device, reform the secured stack and replace it into its operative position within the water environment.

The frequency of these procedures within each total growth period is dependent upon factors encountered in the particular growth environment. One factor in this regard is the growth rate provided by the particular water environment. The system contemplates the provision of an operative oyster confining space associated with each device within which growth will take place in a generally uncrowded condition to insure that the oysters will grow individually rather than attached to one another. Another factor is the presence within the particular water environment of predatory water life, such as oyster drills and the like. The confined space within which growth takes place must be in reasonably free communication with the water environment in order for the oysters to receive sufficient nourishment from the water environment to promote growth. The necessity for this communication gives rise to the possibility that predatory water life can have access to the oysters within the growth space. Consequently, as a practical matter the cleaning procedures noted above become necessary from time to time to remove from the devices predatory water life, such as oyster drills, which have entered the devices from the water environment as immature or baby oyster drills incapable of inflicting serious damage, but which may have grown within the oyster confining spaces to sizes capable of inflicting such damage. The factor of providing sufficient growth space can be readily controlled by varying the density of the oysters loaded within the device (i.e. the number of oysters per unit space). It has not proven practical to simply employ an initial density which would provide sufficient growing space for the seed oysters to expand to full maturity during the entire growth period because of the predatory water life limitation. Thus, since the necessity to clean would require removal of the devices from the water environment during the total growth period, the initial density of the seed oysters is chosen so that the available growth space will be substantially filled within an interim time period where a cleaning procedure is necessitated. At that time, the oysters are redistributed within the originally used devices and additional devices at a lesser density.

With respect to the growth space required, it will be understood that the percentage increase in size per unit time decreases as the oyster growth period increases. Likewise, the ability of the oysters to withstand damage from immature predatory water life increases as the growth period increases. Consequently the interim time period within which the devices must be removed for redistribution and cleaning purposes increases as the growth period increases, as for example, from a period of approximately two months to a period of approximately five months, taking into account the non-growth portion of the total growth period.

With the above in mind, it will be understood that the device 10 in accordance with the principles of the present invention includes a range of structural configurations capable of achieving the operating functions set forth. In order to support immature seed oysters, the perforations 18 in the bottom wall 12 have a maximum size such that the largest dimension measured in any direction does not exceed approximately ¾ inch. In the preferred embodiment shown, the perforations are of circular configuration having a diameter of approximately ⅜ inch, which diameter also constitutes the largest dimension of the perforation measured in any direction. In order to permit relatively free flow of water through the bottom wall 12 during vertical movements of the tray into and out of operative position within a body of water, the perforations constitute a percentage of the operative interior area within a range of from 10 to 55 percent. In the preferred embodiment the perforations constitute approximately 30 percent of the area. It will be noted that the perforations are disposed in rows with the centers of the perforations in adjacent rows being offset or staggered. This arrangement is preferred as providing an optimum plastic flow during the molding operation.

The perforations 26 in the side walls are limited in their maximum size by the necessity to provide the function of excluding from the operative space predatory water life, such as relatively mature oyster drills or the like. A maximum dimension of approximately ⅜ inch measured in any direction is considered operative. The preferred perforations are circular and have a diameter of approximately ¼ inch. In order to provide sufficient flow of water through the side walls when the tray is in operative position within a body of water, the perforations should constitute a percentage of the operative interior area of the side walls within a range of from 10 to 55 percent. In the preferred embodiment shown, the perforations constitute approximately 30 percent of the total operative interior area of the side walls. Again, the perforations are arranged similar to those of the bottom wall to permit optimum plastic flow during molding.

In order to accommodate the growth of immature shellfish to a mature size and to permit an efficient number of devices within a given stack height, the side walls have a height such that the vertical dimension of the operative space is at least approximately 1 inch but not more than approximately 4 inches. The preferred height shown is approximately 2 inches.

It will be understood that in using the devices 10 in accordance with the procedures set forth above, it is preferable to provide a means for securing the devices together in vertically stacked relation. As best shown in FIG. 1, a preferred means is to utilize straps, as indicated at 62. The straps are engaged through strap receiving openings 64 formed in the central portion of each side wall below the upper flange 28 thereof. As shown in FIG. 1, the straps extend upwardly from the openings 64 in the lowermost device along the stack on the exterior of the sides thereof and through the openings 64 of the upper tray device where they are secured together so as to provide a point of attachment to a line, such as indicated at 66 in FIG. 1, by which the secured-together devices may be raised and lowered out of and into the body of water. It will be noted that the straps 62 serve to block the openings 64 during operation, thus preventing entry of oyster drills therethrough.

It will be understood that in operation, depending upon the bottom conditions, the lowermost device may serve simply to support the secured-together vertical stack of devices without being loaded with oysters. While the system utilizing the devices 10 of the present invention has proven operable with respect to oysters, it is contemplated that it may likewise be useful in sustaining the growth of other shellfish. However, in this regard, it will be recognized that not all shellfish can be grown with the use of the present devices. For example, clams require a mud environment for their growth and consequently their growth can not be sustained by the use of the present devices in the system described above. The expression shellfish, such as oysters and the like, refers to oysters and other shellfish having the capability of growth by means of the system described.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. A device for sustaining the growth of shellfish such as oysters and the like comprising a tray molded of plastic material including a bottom wall of generally rectangular configuration having four integrally interconnected side walls formed integrally with the periphery of said bottom wall and extending vertically upwardly therefrom, compatible upwardly and downwardly facing tray supporting surface means formed respectively along the upper end portions of said side walls and along the juncture between said side walls and said bottom wall operable when said tray is arranged in an operative vertically stacked relation with a plurality of like trays to support the trays in said stacked relation with the upwardly and downwardly facing tray supporting surface means of adjacent trays of the stack disposed in interengaged supporting relation, compatible upper and lower stacking means adjacent said upwardly and downwardly facing tray supporting surface means respectively operable when said tray is disposed in said operative stacked relation with a plurality of like trays to positively prevent relative horizontal movement between adjacent trays of the stack, the interior surfaces of the walls of said tray when disposed in said operative stacked relation with a plurality of like trays defining the bottom portion of an operative space for containing shellfish the top portion of which is defined by the exterior surface of the bottom wall of the like tray in the stack immediately thereabove with the interengaged tray supporting surface means and stacking means providing a peripheral enclosure between said top and bottom portions, said bottom wall having perforations formed therein constituting a percentage of the operative interior area thereof within a range of from 10 to 55 so as to permit relatively free flow of water therethrough during vertical movements of the tray while secured in said operative stacked relation into and out of an operative position within a body of water the largest dimension of the perforations in said bottom wall measured in any direction being of the order of ¾ inch so as to support immature shellfish within said operative space, said side walls having a height such that the vertical dimension of said operative space is at least approximately 1 inch but not more than approximately 4 inches so as to accommodate growth of immature shellfish supported within said operative space to a mature size while permitting an efficient number of trays within a given stack height, said side walls each having perforations formed therein constituting a percentage of the operative interior area thereof within a range of from 10 to 55 percent to permit a flow of water therethrough when disposed in said operative position sufficient to nourish immature shellfish supported in said operative space, the largest dimension of the perforations in said side walls measured in any direction being of the order of ⅜ inch so as to exclude from said operative space predatory water life such as relatively mature oyster drills or the like.

2. A device as defined in claim 1 wherein the perforations in said bottom wall constitute a percentage of the operative interior area thereof of approximately 30 and the perforations in said bottom wall are circular and have a diameter of approximately ⅜ inch.

3. A device as defined in claim 1 wherein said side walls have a height such that the vertical dimension of said operative space is approximately 2 inches.

4. A device as defined in claim 1 wherein the perforations in said side walls constitute a percentage of the operative interior area thereof of approximately 30 and the perforations in said side walls are circular and have a diameter of approximately ¼ inch.

5. A device as defined in claim 1 wherein the perforations in said bottom wall constitute a percentage of the operative interior area thereof of approximately 30, the perforations in said bottom wall being circular and having a diameter of approximately ⅜ inch, said side walls having a height such that the vertical dimensions of said operative space is approximately 2 inches, the perforations in said side walls constituting a percentage of the operative interior area thereof of approximately 30, and the perforations in said side walls being circular and having a diameter of approximately ¼ inch.

6. A device defined in claim 1 wherein each side wall is formed with a horizontally elongated opening in the central portion thereof of a size to receive therethrough strap means for securing together the trays in said operative stacked relation, each of said openings being disposed in a position to be closed by the strap means when secured in said stacked relation thereby.

7. A device as defined in claim 1 wherein said bottom wall is formed with strengthening ribs on the interior surface thereof of a height substantially less than the height of said side walls disposed so as to partition the bottom wall into quadrants.

8. A device as defined in claim 7 wherein said bottom wall is substantially square in plan.

9. A device as defined in claim 1 wherein each of said side walls includes a generally horizontally extending flange formed along the upper edge thereof, the upper surfaces of said horizontally extending flanges defining at least a part of said upwardly facing tray supporting surface means, said tray having a generally vertically extending flange formed along the juncture between said bottom wall and each of said side walls, the lower surfaces of said vertically extending flanges defining at least a part of said downwardly facing tray supporting surface means, said upper stacking means including an elongated stacking rail extending upwardly from the inner portion of the horizontally extending flange adjacent each side wall.

10. A device as defined in claim 9 wherein each of said stacking rails includes vertically extending end surfaces disposed in closely spaced relation to the adjacent side walls, said lower stacking means including end walls extending laterally inwardly adjacent opposite ends of each vertically extending flange in a position to engage an associated end surface of an associated stacking rail of a like tray disposed therebelow in said operative stacked relation.

11. A device as defined in claim 10 wherein each end wall is provided with a centering groove on the lower surface thereof for guidingly engaging said associated rail, each of said rails including an upwardly extending ramp adjacent each end thereof of a vertical dimension at least as great as the vertical dimension of said centering groove.

12. A device as defined in claim 11 wherein said tray includes a second vertically extending flange disposed in spaced parallel relation to each of said first mentioned vertically extending flanges a distance sufficient to receive therebetween an associated rail of a like tray disposed in said operative stacked relation, each of said second flanges having a ramp extending upwardly and inwardly from the central lower surface thereof.

* * * * *